Patented Apr. 17, 1945

2,373,926

UNITED STATES PATENT OFFICE 2,373,926

AZO DYESTUFFS

Joseph H. Trepagnier, Wilmington, Del., assignor to E. I. du Pont de Nemours & Company, Wilmington, Del., a corporation of Delaware No Drawing. Application June 17, 1943,
Serial No. 491,221

8 Claims. (Cl. 260—155)

This invention relates to insoluble azo dyes which are preferably applied by development either as ice colors or in stabilized printing compositions.

The object of this invention is to prepare a class of azo dyestuffs having a wide variety of shades, and which have good fastness, particularly to light and chlorine.

The objects of the invention are accomplished, generally speaking, by coupling a diazotized primary arylamine free from water solubilizing groups such as carboxylic and sulfonic acids, to an hydroxy-benz-(a)-acridine, in which the hydroxy group is in one of positions 2, 9, and 10. The benz-(a)-acridine nucleus may also contain halogen substituents, of which chlorine is a preferred member.

The new dyestuffs may be produced on the fiber by impregnating the fiber with an alkaline solution of the coupling component, followed by development with a diazotized arylamine free from water solubilizing groups. The dyestuffs can also be efficiently produced by stabilizing the diazo in alkaline medium with a compound such as 2-ethyl-amino-5-sulfo-benzoic acid, incorporating it with the coupling component in a printing paste, applying the paste to the fiber and developing by steam or acidified steam.

The coupling components may be prepared by the methods described in Berichte 37, 3080 (1904); Berichte 39, 2439 (1906), and German Patent 123,260.

Diazotization of the diazo component may be carried out in the usual manner.

The following examples illustrate but do not limit the invention:

EXAMPLE I

Twenty parts of 2-hydroxy-benz-(a)-acridine were dissolved in a mixture of 40 parts of alcohol, 13 parts of a 25% caustic soda solution and 30 parts of warm water. This was diluted to 1,000 parts by volume by adding a warm solution of 13 parts of 25% caustic soda solution and 2 parts of Alkanol B in 1,000 parts of water. Cotton cloth was padded with this solution and, after dyeing, developed with a properly buffered solution of diazotized 5-nitro-2-amino-anisole. After soaping, a beautiful chocolate brown shade was produced, which was fast to light and chlorine. The structure of the dye is probably:

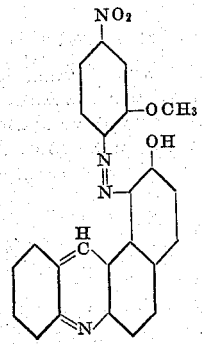

Using the same coupling components and varying the diazo component, the following wide range of shades was obtained:

Table I

| Diazo component | Shade |
|---|---|
| 2,5-dichloro-aniline | Red brown. |
| Dianisidine | Blue black. |
| 4-nitro-2-amino-anisole | Chocolate brown. |
| 1-amino-anthraquinone | Very dull red. |
| 4-chloro-2-nitro-aniline | Chocolate brown. |
| 3-chloro-aniline | Red brown. |
| 4-nitro-aniline | Brown. |
| 2-nitro-aniline | Red brown. |
| 3-nitro-4-amino-anisole | Chocolate brown. |
| 5-nitro-2-amino-toluene | Do. |

EXAMPLE II

Cotton broadcloth was printed with a printing paste containing in 1,000 gram:

| | Grams |
|---|---|
| 2-hydroxy-benz-(a)-acridine | 16 |
| The diazoimino compound prepared from diazotized 5-nitro-2-amino-anisole and 2-ethylamino-5-sulfo-benzoic acid (purity 55%) | 55 |
| Cellosolve | 40 |
| 32% caustic soda solution | 30 |
| Starch tragacanth thickener | 600 |
| Water | 259 |

The print was dried, steamed for four minutes in steam containing formic and acetic acid, soaped in a 160° F. soap solution, rinsed and dried.

A rich chocolate brown was obtained which had good washing, light and chlorine fastness.

By subsituting 38 parts of the diazoimino prepared from diazotized 5-nitro-2-amino-toluene and 2-ethyl-amino-5-sulfo-benzoic acid for the diazoimino in the above formula, a neutral brown print was obtained which had good chlorine, light and washing fastness.

EXAMPLE III

Cotton sheeting was padded with an alkaline solution of 2-hydroxy-11-chloro-benz-(a)-acridine at a concentration of 20 parts per thousand. The material was dried and pieces of it were developed with the diazotized amines listed in Table II which also lists the colors obtained.

Table II

| Diazo component | Shade of soaped dyeing |
|---|---|
| Dianisidine | Blue black. |
| 5-nitro-2-amino-anisole | Very dull violet. |
| 4-nitro-2-amino-anisole | Red brown. |
| 3-chloro-aniline | Do. |
| 1-amino-anthraquinone | Do. |
| 5-nitro-2-amino-toluene | Chocolate brown. |
| 4-chloro-2-nitro-aniline | Brown. |
| 2,5-dichloro-aniline | Red brown. |

EXAMPLE IV

Cotton sheeting was padded with a solution containing 15 parts per thousand of 9-hydroxy-benz-(a)-acridine. By developing pieces of this padded cloth with the diazo components indicated in Table III the colors described in the table were produced.

Table III

| Diazo component | Shade of soaped dyeing |
|---|---|
| 1-amino-anthraquinone | Scarlet. |
| 5-nitro-2-amino-anisole | Do. |
| 4-chloro-2-amino-anisole | Orange. |
| 5-nitro-2-amino-toluene | Scarlet. |
| Dianisidine | Dull red blue. |

EXAMPLE V

Substituting the diazo components of Table IV for those of Table III and 10-hydroxy-benz (a)-acridine for the 9-hydroxy-benz-(a)-acridine in Example IV, the shades indicated in Table IV were obtained. 10-hydroxy-benz-(a)-acridine was prepared by hydrolyzing 10-acetyl-amino-benz-(a)-acridine with 10% sulfuric acid at 200° C. in a manner very similar to that used in preparing 9-hydroxy-benz-(a)-acridine.

Table IV

| Diazo component | Shade of soaped dyeing |
|---|---|
| 4-nitro-2-amino-anisole | Scarlet. |
| 5-nitro-2-amino-anisole | Red. |
| 1-amino-anthraquinone | Yellow scarlet. |

As many apparently widely different embodiments of this invention may be made without departing from the spirit and scope thereof, it is to be understood that I do not limit myself to the specific embodiments thereof except as defined in the appended claims.

I claim:

1. A compound represented by the formula

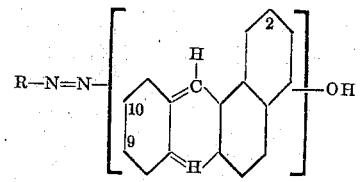

wherein R is an aromatic radical free from solubilizing groups of the class consisting of the benzene, biphenyl and anthraquinone series and OH is in one of the positions 2, 9 and 10.

2. A compound represented by the formula of claim 1 in which R is a radical of the benzene series free from water-solubilizing groups, and OH is in one of the positions 2, 9, and 10.

3. A compound represented by the formula of claim 1 in which R is a radical of the diphenyl series free from water-solubilizing groups, and the OH is in one of the positions 2, 9, and 10.

4. A compound represented by the formula of claim 1 in which R is a radical of the benzene series free from water-solubilizing groups, and OH is in position 2.

5. A compound represented by the formula of claim 1 in which R is a radical of the diphenyl series free from water-solubilizing groups, and OH is in position 2.

6. The compound represented by the formula of claim 1 in which R is the radical of 5-nitro-2-amino-anisole, and OH is in position 2.

7. The compound represented by the formula of claim 1 in which R is the radical of 5-nitro-2-amino-toluene, and OH is in position 2.

8. The compound represented by the formula of claim 1 in which R is the radical of dianisidine and OH is in position 2.

JOSEPH H. TREPAGNIER.

Certificate of Correction

Patent No. 2,373,926.                                                                 April 17, 1945.

JOSEPH H. TREPAGNIER

It is hereby certified that error appears in the printed specification of the above numbered patent requiring correction as follows: Page 2, second column, lines 17 to 24 inclusive, claim 1, strike out the formula and insert instead the following—

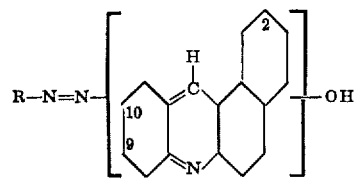

and that the said Letters Patent should be read with this correction therein that the same may conform to the record of the case in the Patent Office.

Signed and sealed this 26th day of June, A. D. 1945.

[SEAL]

LESLIE FRAZER,
*Acting Commissioner of Patents.*